United States Patent
Larsson et al.

(10) Patent No.: US 7,464,166 B2
(45) Date of Patent: Dec. 9, 2008

(54) CONTENTION-BASED FORWARDING WITH INTEGRATED MULTI-USER DETECTION CAPABILITY

(75) Inventors: Peter Larsson, Solna (SE); Niklas Johansson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 929 days.

(21) Appl. No.: 10/729,835

(22) Filed: Dec. 8, 2003

(65) Prior Publication Data
US 2004/0205105 A1 Oct. 14, 2004

Related U.S. Application Data

(60) Provisional application No. 60/461,840, filed on Apr. 11, 2003.

(51) Int. Cl.
*G06F 15/16* (2006.01)
(52) U.S. Cl. .................. 709/228; 370/252; 370/254; 370/230
(58) Field of Classification Search ............... 709/228; 370/254, 252, 230
See application file for complete search history.

(56) References Cited

U.S. PATENT DOCUMENTS

| 6,097,703 | A | 8/2000 | Larsen | |
|---|---|---|---|---|
| 6,618,433 | B1 | 9/2003 | Yellin | |
| 2002/0051425 | A1 | 5/2002 | Larsson | |
| 2006/0114826 | A1* | 6/2006 | Brommer | 370/230 |

OTHER PUBLICATIONS

Selection Diversity Forwarding in a Multihop Packet Radio Network with Fading Channel and Capture; Peter Larsson; Oct. 2001.*
Scheduling and Performance of Multihop Radio Networks with Multiuser Detection, Shrader et al., Proceedings of the 2nd Swedish Workshop on Wireless Ad-Hoc Networks, Mar. 5-6, 2002.
Toward Self-Organized Mobile Ad Hoc Networks: The Terminodes Project, IEEE Communications Magazine, Jan. 2001, Hubaux et al., pp. 118-124.
Combined Routing & Scheduling for Spatial TDMA in Multihop Ad Hoc Networks, Wireless Personal Multimedia Communications, 2002, Sanchez et al, pp. 781-785.

(Continued)

*Primary Examiner*—John Follansbee
*Assistant Examiner*—Glenford Madamba
(74) *Attorney, Agent, or Firm*—Nixon & Vanderhye P.C.

(57) ABSTRACT

A basic idea is to employ multi-user detection (MUD) at the receiver side in a multi-hop network to concurrently decode multiple packets transmitted from multiple nodes ($T_1$, $T_2$), and prioritize among the correctly decoded packets to select one or more packets suitable for forwarding, and finally reply with a packet acknowledgement (ACK) to the corresponding transmitting node for each selected packet. In this way, the design choice of MUD is exploited in the forwarding procedure. It is furthermore beneficial to exploit also the diversity enabled by the existence of multiple relay nodes ($R_1$, $R_2$, $R_3$). A transmitting node that transmits its data packet signal to multiple relay candidate nodes and then receives packet acknowledgements from at least two relay candidate nodes preferably performs a prioritization to select a suitable relay node. The transmitting node then transmits a forwarding order (FO) to the selected relay node, which takes on responsibility for forwarding the information to the next node.

36 Claims, 8 Drawing Sheets

OTHER PUBLICATIONS

Seedex: A Mac Protocol for ad hoc networks, Rozovsky et al., Dept of Electrical and Computer Engineering, and Coordinated Science Laboratory, pp. 67-75; Oct. 2001.

Optimal transmission Ranges and Code Rates for Frequency-Hop Packet Radio Networks, M. Subbarao et al., IEEE Transactions on Communications, vol. 48, No. 4, Apr. 2000, pp. 670-678.

3GPP2 C.S0024, Version 2, Oct. 27, 2000, CDMA 2000 High Rate Packet Data Air Interface Specification, 3rd Generation Partnership Project 2, 3GPP2.

Opportunistic Beamforming Using Dumb Antennas, IEEE Transaction on Information Theory, vol. 48, No. 6, Jun. 2002, Viswanath et al., pp. 1277-1294.

Network Protocols for Frequency-Hop Packet Radios with Decoder Side Information, Pursley et al, IEEE Journal on Selected Areas in Communications, vol. 12, No. 4, May 1994, pp. 612-621.

The DARPA Packet Radio Network Protocols, Jubin et al., Proceedings of the IEEE, vol. 75, No. 1, Jan. 1987, pp. 21-32.

3GPP TS [25.308] VO.1.0 (Sep. 2001), 3rd Generation Partnership Project; Technical Specification Group Radio Access Network; UTRA High Speed Downlink Packet Access; Overall Description; Stage 2, (Release 5), pp. 1-28.

The Spatial Capacity of a Slotted Aloha Multihop Packet Radio Network with Capture, Nelson et al., IEEE Transactions on Communications, vol. Com. 32, No. 6, Jun. 1984.

Position Based CDMA with Multiuser Detection (P-CDMA/MUD) for Wireless Ad Hoc Networks, Rodoplu et al., IEEE $6^h$ Int. Symp. on Spread-Spectrum Tech & Appli., Sep. 6-8, 2000.

Scheduling and Performance of Multihop Radio Networks with Multiuser Detection, Shrader et al., Radio Communications Systems; Mar. 5-6, 2002.

Raphael Rom et al., "Multiple Access Protocols", Performance and Analysis, Springer-Verlag, Jun. 1989, pp. 1-5.

Enhanced Interior Gateway Routing Protocol, Document ID: 16406, Sep. 9, 2005, pp. 1-45.

European Communication in European Application No. 04 721 406.9-2413 dated Jul. 10, 2006.

European Decision to Grant in European Application No. 04721406.9-2413/1616411 dated Oct. 18, 2007.

Related U.S. Appl. No. 10/729,846, filed Dec. 8, 2003; Inventor: Peter Larsson et al.

International Preliminary Report on Patentability issued Oct. 14, 2005 and Written Opinion of the International Searching Authority mailed Jun. 18, 2004 in corresponding PCT Application PCT/SE2004/000384.

* cited by examiner

CONTENTION-BASED FORWARDING WITH INTEGRATED MULTI-USER DETECTION CAPABILITY

This application claims the benefit of U.S. Provisional Application No. 60/461,840 filed 11 Apr. 2003, the entire contents of which is incorporated herein by reference.

TECHNICAL FIELD

The present invention generally relates to communication networks, and more particularly to multi-hop networks.

BACKGROUND

Protocols for sharing a wireless medium effectively among multiple users are generally denoted multiple access protocols, channel access schemes or medium access schemes. Multiple access protocols may as described in [1] be divided in two main categories: conflict-free protocols and contention-based protocols.

Conflict-free protocols are protocols ensuring that a transmission, whenever made, is successfull, i.e. not interfered by other transmissions. Conflict-free transmission can be achieved by allocating the channel to the users either statically or dynamically. This is often denoted fixed and dynamic scheduling, respectively. The benefit of precise coordination among stations is that it is believed to provide high efficiency, but comes at the expense of complexity and exchange of sometime large quantities of control traffic.

Contention-based protocols differ in principle from conflict-free protocols in that transmissions are not guaranteed to be successful. The protocol should therefore prescribe a procedure to resolve conflicts once they occur so that all message are eventually transmitted successfully.

Multiple access protocols can also be divided based on the scenario or application for which they have been designed. Some protocols are suitable for access towards/from a single station, e.g. a base station in a cellular system, whereas other protocols are designed to operate in a distributed environment. An important distinction for the distributed case is whether the protocol is designed primarily for a single hop case, i.e. communication only with a designated neighbor within reach, or if it is particularly designed for a multi-hop scenario.

In a multi-hop scenario, information may be transmitted over multiple hops between source and destination instead of directly in a single hop. In general, the multi-hop approach offers several advantages such as lower power consumption and higher information throughput compared to a direct one-hop approach. In a multi-hop network, nodes out of reach from each other can benefit from intermediately located nodes that can forward their messages from the source towards the destination. Multi-hop networks can be so-called ad hoc networks where nodes are mostly mobile and no central coordinating infrastructure exists, but the idea of multi-hop networking can also be applied when nodes are fixed.

In prior art routing techniques based on an underlying shortest path routing protocol (such as Bellman-Ford based routing), a well-defined multi-hop route from source to destination is determined based on routing cost information passed through the system. Simplified, each node or station knows the costs of its outgoing links, and broadcasts this information to each of the neighboring nodes. Such link-cost information is typically maintained in a local database in each node, and based on the information in the database, a routing table is calculated using a suitable routing algorithm. In general, shortest path and similar routing techniques lead to the existence of a single route for each source-destination pair. A very simple shortest-path-based routing scheme, though not the most efficient, may for example use the well-known ALOHA contention-based multiple access protocol.

There are existing protocols (which may use an underlying shortest path protocol) based on the concept of exploiting multiple nodes in the forwarding process with a more or less active routing choice. For example, the protocol called EIGRP (Enhanced Interior Gateway Routing Protocol) [2] is a routing protocol used mainly in a fixed network that allows random-based forwarding to one out of several routers. Random-but-forward routing [3] by Sylvester and Kleinrock is similar to EIGRP, i.e. random-based forwarding of packets to one out of several packet radio network routers, but it also includes an important amendment; it is ensured that a packet is always heading in the general correct direction. Alternate path routing [4] by DARPA (Defense Advance Research Project Agency) allows a packet that is retransmitted over a link to be duplicated while multicasted to several nodes from which the packet again follows a shortest path routing approach. Primary N/M-forwarding [5] is based on the idea that a node tries to send a packet at most N times to a node and then, if failing, it tries the next node up to N times. This procedure is repeated for at most M nodes prior to dropping the packet. The advantage of alternate path routing and primary N/M-forwarding is that they can adapt to the local communication situation, including congestion and temporarily poor communication due to e.g. fading or interference fluctuations.

Changes or fluctuations within the system over time can create windows or peaks of opportunity that enable signal transmissions to be more successful than at other times and conditions. Plain shortest-path techniques and associated prior art routing techniques do not have the ability to recognize these windows of opportunity, since there is no relative information stored by each node or station. In contrast, opportune routing [6, 7] exploit to some extent the opportunities that system changes and fluctuations provide. In the context of wireless routing in particular, overall system performance is degraded when link quality varies rapidly over time (e.g. due to Rayleigh fading). However, opportune routing partly mitigates this performance degradation by making use of the windows of opportunity that these fluctuations provide. With opportune routing, there is not a single route for each source-destination pair, i.e. similar to EIGRP, random-but-forward and to some extent also alternate path routing and primary N/M-forwarding. Instead, data packets follow a route that is somewhat random, while still leading from source to destination. Consequently, when a shortest-path procedure is used, consecutive packets will generally be sent over the same route, whereas when opportune routing is used, consecutive packets may be routed over different paths but in the same direction.

However, the general monitoring in [6, 7] is a slow process. Monitoring is either handled by listening on bypassing messages or by occasionally sending out so-called probes. When a probe is sent out, a response that includes information on for example path loss is expected back. When there is a delay between the probe and data transmission, then the returned input information for the forwarding algorithm may become obsolete by the time the data is transmitted. A particularly undesirable consequence is that existing opportune routing, and also plain shortest-path routing techniques, do not handle possible diversity effects efficiently.

Selection diversity forwarding (SDF) [8] is a technique for efficiently handling diversity effects in a near optimal manner. This novel approach is based on directing transmission from an originating station to a group of receivers or stations nearby. When one or more of the receiving stations have replied, one of the replying stations is selected and a command message is transmitted to the selected station instructing it to assume responsibility for forwarding the data message. The process is repeated for all subsequent responsible stations until the information reaches the destination. By following this approach, both branch diversity and capture effects can be exploited in the data forwarding process. In particular, branch diversity reduces the need to use interleaved data together with coding to combat fading channels, which in turn means smaller delay and consequently higher throughput. The capture effect refers to a phenomenon in which only the stronger of two signals that are at or near the same frequency is demodulated, while the weaker signal is suppressed and rejected as noise. In conjunction with multiple receiving stations, the capture effect provides a high degree of robustness when data transmissions collide. SDF utilizes a slow underlying cost protocol, but allows instantaneous adaptation to fast channel fluctuations per se.

Similar ideas for exploiting fluctuations, but for normal cellular networks with single hops, can be found in [9, 10 and 11], which refer to High Speed Downlink Packet Access (HSDPA), High Data Rate (HDR) and Opportunistic Beamforming (OB), respectively. HSDPA and HDR are very similar to each other. Opportunistic Beamforming however is different from a functional point of view in that OB randomly points, or continuously sweeps an antenna beam, in different directions, whereas HSDPA and HDR has no notion of beamforming. In particular, Opportunistic Beamforming [11] exploits the opportunistic idea and then utilizes the opportunistic approach with respect to beamforming to enhance system capacity in a cellular system or at a base station. However, the concept of HSDPA, HDR and OB as such does not relate to multi-hopping. OB is essentially an extension of fast scheduling at the base station taking fast channel fluctuations into account, which has been suggested both for CDMA 2000 HDR and WCDMA HSDPA.

SUMMARY

The present invention overcomes these and other drawbacks of the prior art arrangements.

It is a general object to provide an efficient mechanism for forwarding information in a multi-hop network.

It is another object to provide a multi-hop routing scheme that exploits the received energy in a packet radio network in a more optimal manner.

Yet another object is to improve the performance of a multi-hop network with regard to throughput, delay characteristics and/or power consumption.

It is an object to improve Quality of Service (QoS) support in the network.

It is also an object to reduce the risk of congestion and buffer overflow.

It is a particular object to provide a method and system for efficient forwarding of information in a multi-hop network.

It is also an object to provide a communication node supporting efficient forwarding of information in a packet radio multi-hop network.

The inventors have recognized that although opportune routing and selection diversity forwarding each constitutes a significant improvement compared to traditional routing, multi-hop/routing schemes do not exploit the received energy in a fully optimal manner, which implies that there is a potential for improvement with regard to throughput and delay characteristics as well as power consumption.

The technology described here is primarily based on a powerful combination of contention-based forwarding and multi-user detection (MUD) at the receiver side in a multi-hop network such as a packet radio multi-hop network, efficiently incorporating and exploiting the of MUD. MUD is employed at the receiver side to concurrently decode multiple packets initially transmitted from multiple nodes, and prioritize among the correctly decoded packets to select one or more packets suitable for forwarding, and finally reply with a packet acknowledgement for each selected packet. In this way, the design choice of MUD is exploited in the forwarding procedure.

Typically, the receiver side prioritizes among the MUD decoded packets based on predetermined prioritization criterion. It is typically desirable to select packets that are optimal in some sense. In order to be able to speak about optimality in a well-defined manner, an objective function is preferably introduced. This function may reflect any of a number of performance objectives. In this respect, it has been recognized that information cost progress is a particularly useful objective function. Considering information cost progress and especially information forward progress, a natural prioritization criterion is to select those packets that have the highest forward progress. Typically, packets with high forward progress are those packets that are received and correctly decoded, while at the same time having a low receive power level (e.g. coming from distant transmitting nodes). High forward progress often means that a packet spends less time in the network, hence leading to reduced delay and increased throughput, and then, by disappearing out of the network fast, offers the radio resources for other traffic.

Preferably, multiple data packets are selected for forwarding, and multiple packet acknowledgements are hence transmitted to a plurality of corresponding transmitting nodes. In this case, it may be beneficial to aggregate multiple packet acknowledgements in a single acknowledgement message that is broadcasted or multicasted to the transmitting nodes.

For improved robustness, instead of automatic forwarding, each transmit node may alternatively transmit a forwarding order to the receiving node in response to a packet acknowledgement, and optionally, the receiving node may then reply with a corresponding forwarding order acknowledgement. A transmit node that receives an acknowledgement associated with a previously transmitted packet may if desired remove the packet from it's queue.

Examples of contention-based multi-hop protocols suitable for integration with MUD include standard shortest-path-based forwarding protocols as well as diversity-oriented and opportunistic forwarding protocols. This is exemplified by traditional ALOHA in conjunction with i) shortest-path-based forwarding and ii) selection diversity forwarding, respectively. Other forwarding schemes that can be integrated with MUD include opportune routing, random-but-forward, primary N/M-forwarding and alternate path routing and as will be seen later even multiple access protocols such as STDMA (Spatial-Time Division Multiple Access).

It is particularly beneficial to integrate diversity forwarding with multi-user detection, exploiting also the diversity enabled by the existence of multiple adjacent relay stations/users. A transmitting node that transmits its data packet signal to multiple relay candidate nodes and then receives acknowledgements from at least two of the relay candidate nodes preferably performs a prioritization procedure to select a suitable relay node from the set of acknowledging relay nodes. The transmitting node then normally transmits a forwarding order to the selected relay node instructing the candidate node to take on responsibility for forwarding the information to the next node.

The invention offers the following advantages:
Efficient multi-hop forwarding;
Increased network performance;
Efficient exploitation of received energy in a packet radio network;
Improved throughput and delay characteristics;
Improved QoS support;
Reduced risk of congestion and buffer overflow; and
High cost and forward progress.

Other advantages offered by the present invention will be appreciated upon reading of the below description.

DETAILED DESCRIPTION

Figure 1:
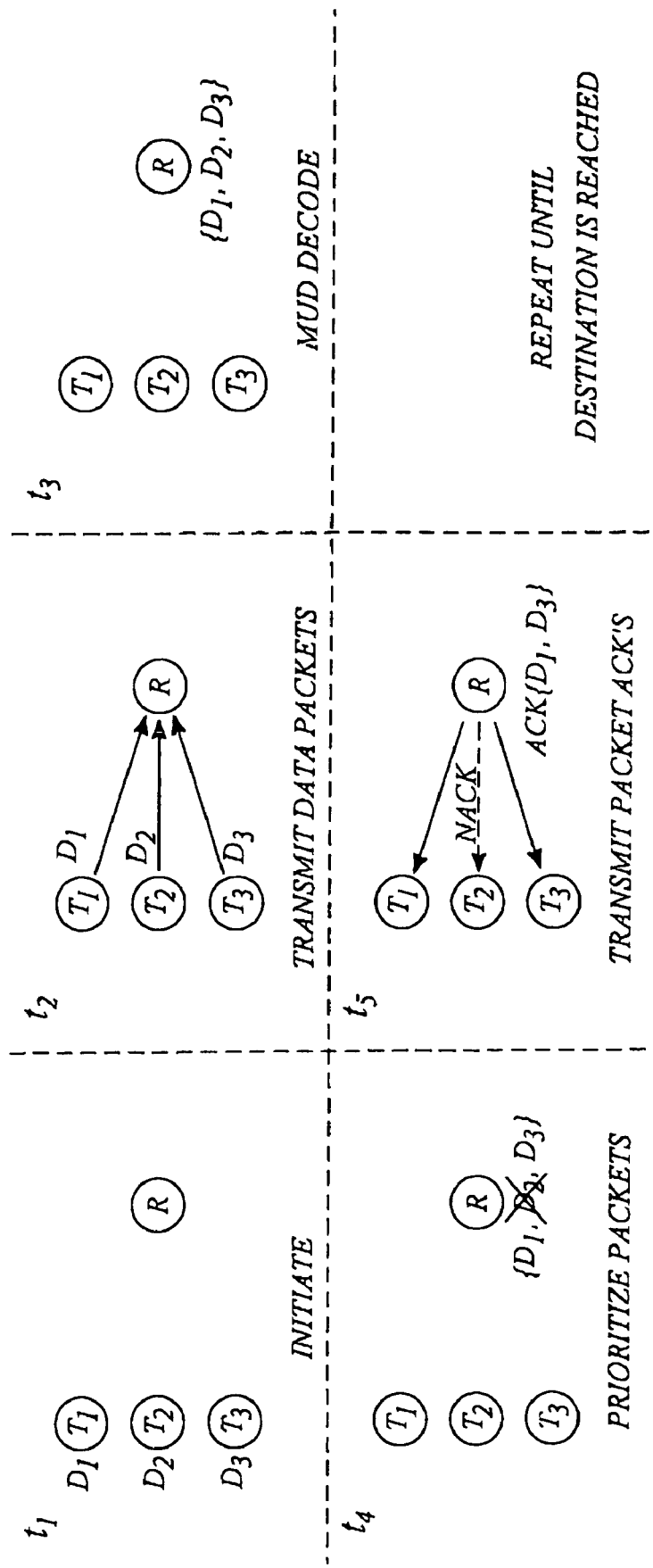
FIG. 1 is a schematic process flow diagram illustrating actions and signaling in relation to multiple transmitting nodes and a receiving node according to a first preferred example embodiment.

Throughout the drawings, the same reference characters will be used for corresponding or similar elements.

Attempts have been made to incorporate MUD in conflict-free multiple access protocols. For example, references [12, 13] refer to scheduled multiple access (Spatial-Time Division Multiple Access, STDMA) in multi-hop packet radio networks, where users employ MUD. However, the task of finding a minimum-length schedule in STDMA as such is known to be virtually intractable and NP-complete (the run-time is non-polynomial, i.e. typically exponential, in relation to the size of the input) and hence one has to settle for heuristic solutions. However, even the heuristic solutions tend to be very complex. In STDMA with MUD, the coordination of transmit power (and rates) and transmit/receive instances will be of even higher complexity due to the added degree of freedoms. Moreover, as the radio channel varies unpredictably, e.g. due to fading, it will be hard to control and maintain the correct receive power levels and to ensure that the MUD-based schedule operates correctly. With a fixed schedule, fading peaks or suddenly appearing relay nodes will render the schedule obsolete and occasionally result in colliding packets and general degraded performance. The focus in reference [12] is on a centralized schedule, as so often assumed for STDMA, even in the stationary case with a non-varying traffic pattern.

The scheme disclosed in reference [14] does not address the MAC (Medium Access Control) layer in a multi-hop network context, but only addresses CDMA (Code Division Multiple Access) with MUD for a (distributed) single-hop network.

The inventors overcame these and other drawbacks of the prior art arrangements.

At the core we find a prioritization procedure together with a scheme for exchange of messages allowing multi-user detection (MUD) to be efficiently incorporated into the framework of contention-based forwarding.

Each information-forwarding node in a multi-hop network such as a packet radio multi-hop network typically includes both receiver and transmitter functionality, which can be invoked as and when, required. However, for simplicity, when focusing on the transmitter functionality we generally talk about the transmitter side and simply refer to the node as a transmitting node and when focusing on the receiver functionality we generally talk about the receiver side and simply refer to the node as a receiving node.

On a conceptual level for a general contention-based multiple access scheme with shortest path routing, an exemplary scheme according to a first preferred embodiment will now be described.

It may happen that a number of data packets following respective routes towards their destination or destinations coincide in time in a specific receiving node. Traditionally, such a situation is treated as a collision at the receiving node, which then generally forwards only the strongest received signal (if decodable). In accordance with the invention, however, a node that receives multiple coinciding signals performs MUD decoding, prioritizes among correctly decoded packets from multiple transmitting nodes, transmits acknowledgement(s) of one or more prioritized packets to the corresponding transmitting nodes and then takes on responsibility for continued forwarding (unless the node is the destination) of prioritized packet(s) along their respective paths towards their destination(s).

With reference to the schematic process flow diagram of FIG. 1:

At $t_1$, a set of transmitting stations or nodes $T_1$, $T_2$, $T_3$ have data packets $D_1$, $D_2$ and $D_3$ to send to a specific intended receiving node R along respective paths to one or more destinations.

At $t_2$, any station or node in receive mode listens to the radio medium and receives a superposition of (potentially) multiple transmitted signals. In particular, node R receives a superposition of signals from transmitting nodes $T_1$, $T_2$, $T_3$.

At $t_3$, the receiving node uses MUD to successfully decode a number of packets $D_1$, $D_2$, and $D_3$.

At $t_4$, a subsequent prioritization is made among the correctly decoded packets to find a set of packets $D_1$ and $D_3$ that would be most desirable to forward. The number of packets that can be accepted for forwarding is possibly limited, e.g. due to limited available buffer space.

At $t_5$, non-colliding or nearly non-colliding feedback acknowledgments are subsequently sent from the receiving node R to the corresponding transmitting nodes $T_1$ and $T_3$, indicating packets that are accepted (i.e. received, decoded and buffered) for forwarding. Preferably, the acknowledgements are aggregated in a single acknowledgement message ACK that is multicasted or broadcasted to the transmitting nodes. Any transmitter that receives an acknowledgment (destined for itself) may optionally remove the transmitted data packet from its transmit buffer. It is also possible for the receiving node to reply with a NACK (Negative-Acknowledgement) to inform the corresponding transmitting node that a transmitted packet was not accepted.

The process is executed for each data packet generated and transmitted from a source node, and repeated until the information reaches the intended destination. Note that decoded packets that are not to be forwarded from the receiving node can be discarded and that transmit buffers may be rescheduled, if desired, when a new packet arrives in order to fulfil any predetermined optimization criterion.

A central point of the proposed MUD-integrated multiple access protocol is the ability for the receiver to select among multiple concurrently decoded packets in the prioritization procedure, thus providing a new form of diversity to be exploited. The packet prioritization is preferably based on optimization of a given objective performance function. In this way, the receiving node can select among multiple concurrently decoded packets to find a set of one or more packets that in some sense gives the highest yield from a performance point of view. It is also possible to consider QoS (Quality of Service) aspects in the prioritization process, since for example different packets may have different QoS requirements. By way of example, a packet with strict delay requirements may then be prioritized higher than a packet with more relaxed delay requirements.

Figure 2:
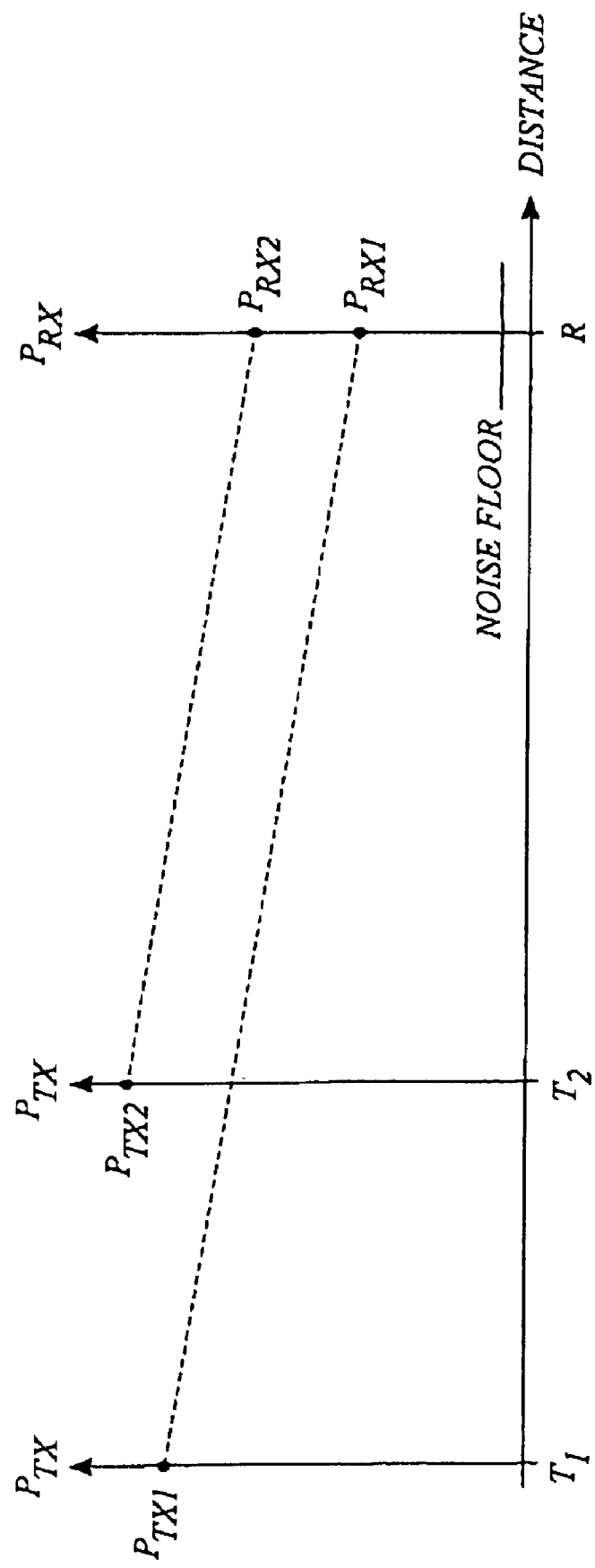
FIG. 2 is a schematic diagram illustrating an example of transmission of signals from two transmitting nodes situated at different distances from a receiving node.

FIG. 2 is a schematic diagram illustrating an example of transmission of signals from two transmitting nodes situated at different distances from a receiving node. The receiving node R receives signals from two transmitting nodes $T_1$ and $T_2$. It can be seen that the signal information from transmitting node $T_1$ has been transported a longer distance than the information from transmitting node $T_2$, and since both signals are received at a receive power level above the noise floor they can generally both be correctly decoded by using MUD at the receiving node R. In general, it is a combination of used rates and receive powers that determine if and which packets that can be decoded. Although the receive power level $P_{RX1}$ of the signal information from transmitting node $T_1$ is lower, it may anyway be more beneficial from a performance point of view to select the signal information from node $T_1$ for forwarding. When information forward progress is considered, packets with high information forward progress are generally those packets that are received and correctly decoded, while at the same time having a low receive power level (usually indicating that the packets are transmitted from distant transmitting nodes). High forward progress often means that a packet spends less time in the network, hence leading to reduced delay and increased throughput, and then, by disappearing out of the network fast, offers the radio resources for other traffic.

In the example of FIG. 1, selected packets are automatically forwarded from the receiving node further on in the network in direction towards their destinations. However, for improved robustness, each transmit node may alternatively transmit a forwarding order to the receiving node in response to a packet acknowledgement, and optionally, the receiving node may then reply with corresponding forwarding order acknowledgements. An example of such an extended message exchange scheme is illustrated in FIG. 3.

Figure 3:
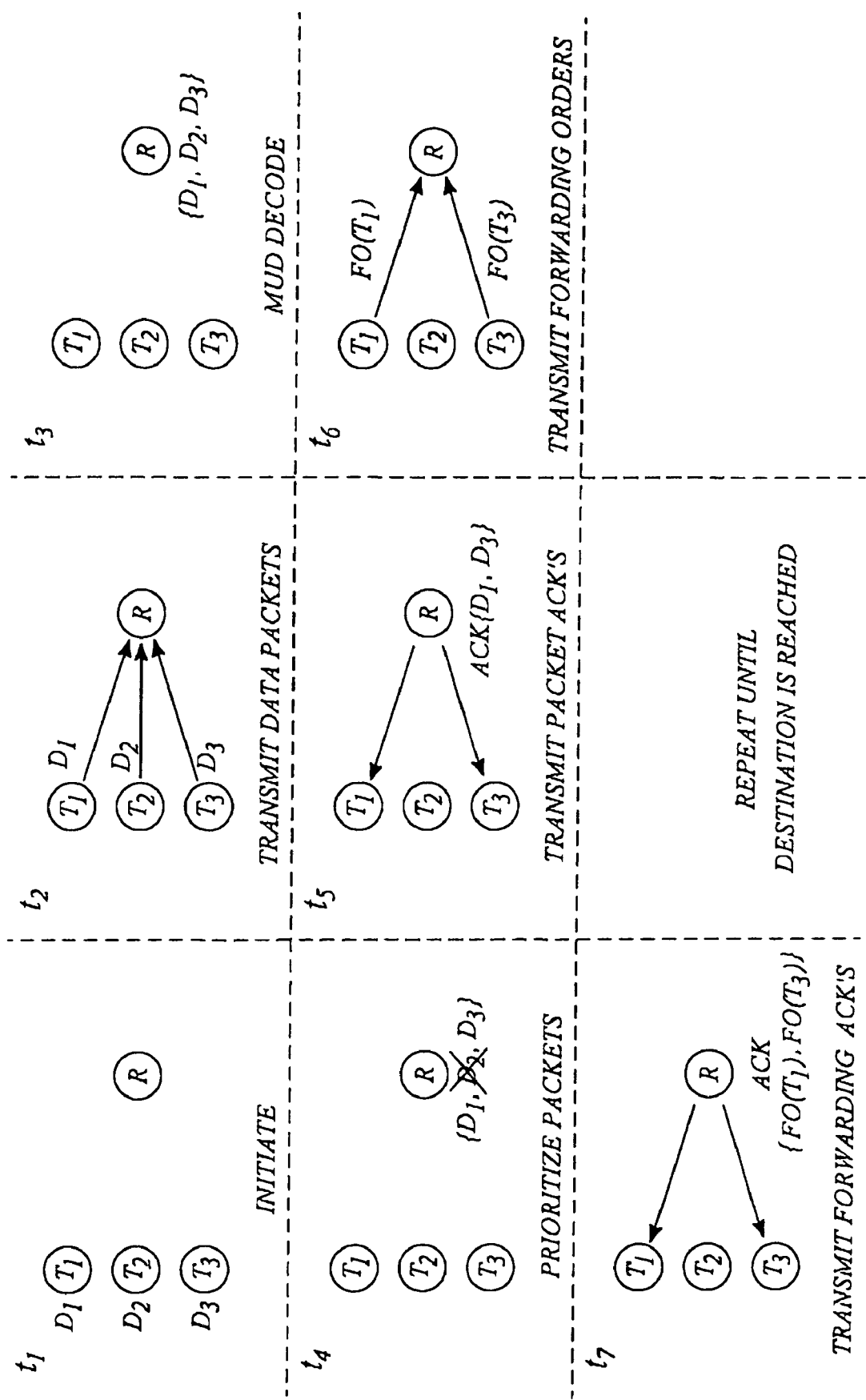
FIG. 3 is a schematic process flow diagram illustrating actions and signaling in relation to multiple transmitting nodes and a receiving node according to a second preferred example embodiment.

FIG. 3 is a schematic process flow diagram illustrating actions and signaling in relation to multiple transmitting nodes and a receiving node according to a second preferred example embodiment. The actions and signaling at time instances $t_1$-$t_5$ are identical to those described in connection with FIG. 1. At time $t_6$, however, each one of the transmitting nodes $T_1$ and $T_3$ that received a respective packet acknowledgement responds with a forwarding order FO to the receiving node R. At $t_7$, the receiving node R replies with corresponding forwarding order acknowledgements to the relevant transmitting nodes $T_1$ and $T_3$. The forwarding order acknowledgements are preferably aggregated in a single acknowledgement message that is multicasted or broadcasted to the transmitting nodes. A transmitting node that receives an acknowledgement associated with a packet residing in the transmit queue within the node may, if desired, remove the packet from the queue. The whole process is then repeated i) when new data packets are transmitted, and ii) until the information reaches the intended destination.

Analysis and simulations have revealed that it is particularly beneficial to integrate diversity forwarding with multi-user detection, exploiting also the diversity enabled by the existence of multiple adjacent relay stations/users.

Briefly, an exemplary message exchange scheme for a diversity-based protocol, such as SDF, operates as follows: Any transmitter, with a packet to send, may determine a set of candidate nodes and transmit the pending packet using multicasting or even broadcasting. Candidate nodes are generally nodes being closer to the destination in terms of an objective cost metric or merely geographic location. Cost information may be obtained from any conventional or future underlying route determination protocol such as a shortest path protocol or a route determination protocol more customized to diversity forwarding. Using diversity forwarding together with an underlying shortest path route determination generally means that the actually selected forwarding path may deviate from the shortest path suggested by the shortest path protocol. The cost information is rather used as a basis for selection of candidate nodes and packet prioritization. A rate may also be selected for the data packet, e.g. based on average path loss to candidate relays and expected interference activity and so forth. Transmit power may similarly be selected in the same manner. In general, rate and transmit power may be determined based on knowledge of the fact that MUD is employed. Any station in receive mode listens to the radio medium and receives a superposition of (potentially) multiple transmitted signals. The receiver uses MUD to decode the data. One or multiple packets may be successfully decoded, and a subsequent prioritization is made among the correctly decoded packet to find a set of packets that would be most desirable to forward. In addition, the number of packets that can be accepted is possibly limited (e.g. due to buffer space). Non-colliding or nearly non-colliding feedback (acknowledgment) packets are subsequently sent from the receiving node, indicating packets that are acceptable (i.e. received, decoded and buffered) for forwarding. Any transmitter, receiving acknowledgements (destined for itself) preferably prioritizes among the acknowledgments and determines a preferred node that should take on responsibility for further relaying of its transmitted packet. Subsequently, a selected preferred node is informed over a non-colliding or nearly non-colliding channel with a forwarding order, and the preferred node then executes the forwarding and may optionally respond with a forwarding order acknowledgement. This process is repeated until the information reaches the destination. Note that decoded packets that are not to be forwarded can be discarded and that transmit buffers may be reordered/rescheduled when a new packet arrives to fulfil any predetermined optimization criterion.

It has been recognized that particularly advantageous implementations can be realized when the existence of multiple adjacent relay stations/users is exploited in diversity-oriented contention-based protocols. As an example, a packet to be sent from a station or node may not be constrained to a single routing path on its way towards its destination, but rather depending on communication conditions and through local transmit adaptation, one or more adjacent relay stations or nodes with good quality links may be exploited in the routing process. Communication conditions that can be benefited from, and provide desired diversity benefits and robustness, include among other things propagation conditions such as the inherent broadcast characteristics of the wireless channel, fluctuating path loss due to fading, fluctuating interference level due to fading, fluctuating interference depending on presence/absence of transmission. In addition to propagation conditions, other aspects are generally also considered in the local adaptation where multiple stations/nodes/users are involved for diversity-oriented contention-based protocols used in multi-hop packet radio networks.

Figure 4:
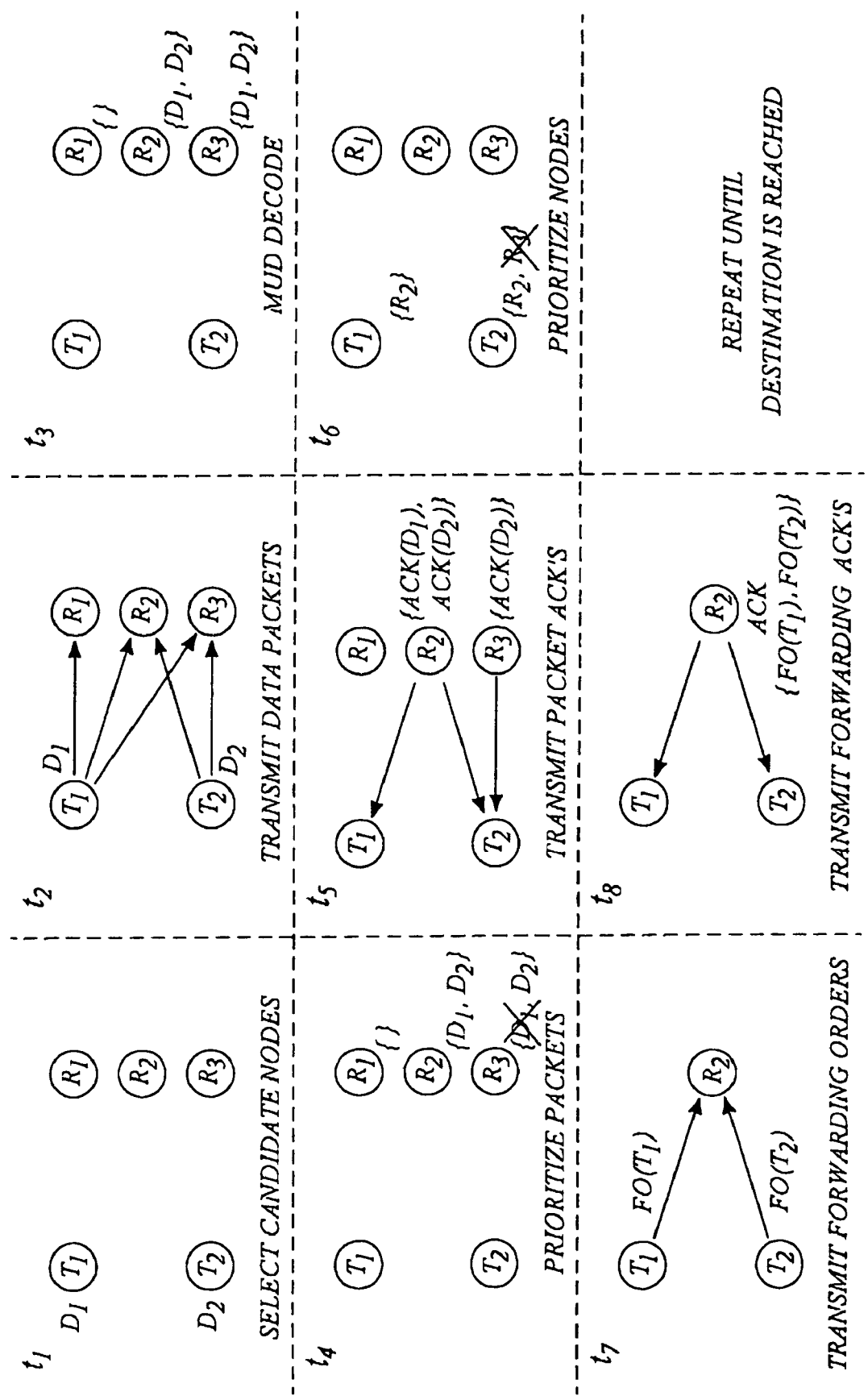
FIG. 4 is a schematic process flow diagram illustrating actions and signaling in relation to multiple transmitting nodes and multiple relay candidate nodes according to a third example preferred embodiment.

The basic idea will now be exemplified in further detail with reference to FIG. 4, illustrated within the particular framework of selection diversity forwarding (SDF). It should though be understood that the invention is generally applicable to any contention-based protocol including opportune routing, selection diversity forwarding (SDF) or any other diversity-oriented contention-based protocol, and even protocols such as random-but-forward routing, primary N/M forwarding and alternate path routing, as well as ALOHA with shortest-path based routing.

In the following example, the system is typically assumed to be designed in such a way that control information packets are small and consumes considerably less resources and energy than data packets.

FIG. 4 illustrates an example of an SDF-based message exchange scheme incorporating multi-user detection as well as packet and candidate node prioritization, where at a time instance $t_1$ two nodes, $T_1$ and $T_2$ have a packet each to transmit. At this stage, candidate nodes $T_1$: $R_1$, $R_2$, $R_3$ and $T_2$: $R_2$, $R_3$ are selected based on information indicating that they are expected to forward the data packets towards the intended destinations. An underlying cost determination protocol (e.g. a shortest-path protocol) can provide such information, thereby ensuring that there is a steady "cost progress".

At $t_2$ packets are transmitted from the transmitting nodes to the candidate nodes using multicast or broadcast techniques. Preferably, the number of candidate nodes is limited and therefore multicasting is typically used for transmitting information in the correct "general direction".

At $t_3$ packets are decoded using multi-user detection. In this particular example, candidate node $R_1$ is not able to decode any packet, whereas candidate nodes $R_2$ and $R_3$ concurrently decode packets $D_1$ and $D_2$.

At $t_4$, the decoded packets are prioritized in each relay candidate node. The purpose of the prioritization may be related to optimizing throughput, improving Quality of Service (QoS) characteristics, battery management, congestion control, and avoiding overflow of receive buffers (flow control). It is desirable to select packets that are optional in some sense. In order to be able to speak about optimality in a well-defined manner, an objective function is preferably introduced and optimized with respect to the decoded packets. The objective function may reflect any of a number of performance objectives. The prioritization may be based on cost progress from the sending node to the receiving node, delay information, prioritization parameters or any other relevant information for the packet prioritization. Prioritization based on cost progress normally requires either cost information to be sent together with the data packets or derived from an underlying cost determination protocol by including the transmit ID in every data packet. In particular, from a throughput point of view, it may be desirable to prioritize packets with high cost progress.

A particular example of a useful objective function is the information cost progress function given below:

$$Z_{ij}^{(D)} = f(\text{Cost}_i^{(D)}, \text{Cost}_j^{(D)}, \ldots),$$

where $Z_{ij}^{(D)}$ is the information cost progress for a packet heading towards destination D and where i is the transmitting node and j is a receiving node. Further, $\text{Cost}_i^{(D)}$ and $\text{Cost}_j^{(D)}$ are the costs seen by the packet heading towards destination D. The information cost progress function is then optimized over all decoded packets, selecting the packet or packets having the highest cost progress. The costs and/or the objective function $f$ could reflect any of a multitude of factors. For instance, the costs and the objective function may reflect the forward progress in geographic distance, but other cost progress measure may also be used. The forward progress in distance may for example be determined based on position information such as GPS (Global Positioning System) information or estimated based on path loss calculations.

The packets normally belong to respective flows, and hence it is possible to use an alternative formulation of the information cost progress function above and perform optimization with respect to flows rather than destinations. In this way, QoS requirements for the different flows may be incorporated into the optimization in a natural way.

In the prioritization process, packets of low priority may occasionally be dropped if needed. Any packets that will not be used may be discarded here or optionally in a later stage. In this example, the candidate node $R_2$ selects packets $D_1$ and $D_2$, whereas candidate node $R_3$ only selects packet $D_2$ (e.g. due to buffer overflow).

In all, the steps and options at $t_4$ provide new and significant benefits over single-user SDF.

At $t_5$ data acknowledgements are transmitted. The acknowledgements are preferably transmitted such that the risk of collision is minimized while ensuring reasonably low overhead, e.g. with an efficient schedule. There is also a possibility to use MUD for receiving multiple control packets concurrently. Note that a single acknowledgement message may (and preferably should) contain multiple data acknowledgements in order to use the radio resources efficiently.

At $t_6$, provided that at least one acknowledgement reaches a transmitting node, it is determined which candidate node or nodes that should take on responsibility for the forwarding. Selecting several relay nodes for forwarding provides a higher degree of robustness, but generally reduces throughput. The prioritization may for instance be based on cost progress, queue status information and/or remaining battery. Such information may be contained explicitly in the acknowledgement message and/or implicitly derived from information that has been received previously, e.g. the cost progress may be a priori known from the underlying route determination protocol. If it is desired to consider factors such as queue status and remaining battery, these factors may be integrated into the cost information, or evaluated separately as a complement to the basic cost progress calculations. For example, a relay candidate node with a low battery level or with a loaded queue may not be prioritized even though it otherwise has a high cost progress.

A difference compared to single-user detection SDF is that in the present scenario the transmitting node typically receives more ACKs and hence has more candidate nodes to prioritize among, and is consequently given greater freedom in shaping QoS, maximizing throughput, cost progress or other important characteristics. In this example, the transmitting node $T_1$ only receives a packet acknowledgement from relay candidate node $R_2$, and hence makes the trivial choice of selecting relay node $R_2$. The transmitting node $T_2$ receives packet acknowledgements from relay candidate nodes $R_2$ and $R_3$, and the result of the prioritization process in this particular example is relay node $R_2$.

At $t_7$, forwarding orders are preferably sent to the selected node or nodes that take on the responsibility of forwarding data. In general, Accepted packets are inserted in the transmit buffer of the selected relay node or nodes according to a predetermined optimization criterion, but optionally an entire rescheduling of the transmit queue may be performed. Various criteria for this may be envisioned, e.g. based on delay or priority classes.

At $t_8$, the selected node or nodes respond with forwarding order acknowledgements. Moreover, at $t_8$, any packets that will not be used (eg. due to the fact that another node has been selected as forwarding node) may be discarded here or optionally in a later stage. The forwarding order acknowledgements are preferably transmitted such that the risk of collision is minimized. Also, similar to the data acknowledgements, the forwarding order acknowledgements may for each responding node be aggregated into a single forwarding-order-acknowledgement message. Note that multiple forwarding orders and forwarding order ACKs may have to be exchanged to ensure controlled forwarding order ARQ (Automatic repeat ReQuest) states. This is the same problem as in traditional ARQ, and well known ARQ methods may be applied.

EXAMPLE OPTIMIZATIONS

As large quantities of control messages are sent, it is vital to keep the overhead and energy consumption as small as possible. This may be achieved by minimizing the quantities of information in the packets by implicit signaling. For instance, instead of using the full address of the candidate nodes, one may use locally (and uniquely) assigned addresses (e.g. under the control of a route determination protocol). Since the addresses are local, short addresses will be sufficient. Another method is to transmit to only those candidate nodes that have a positive cost progress or a cost progress within a specific range or interval (e.g. exceeding a positive threshold). Hence, the address field is replaced with a shorter cost requirement field. One may also address candidate nodes implicitly by indicating that they are (a set of) neighbors of some neighbor of a transmitting node. For example, a candidate node is explicitly addressed in the packet, and one or more other suitable relay candidate nodes are implicitly addressed by indicating in the packet that they are neighbors of the explicitly addressed candidate node. This requires a protocol to be executed that establishes neighbor relations, e.g. an incorporated function in a route determination protocol, as well known in Internet (Hello messages). This means that the overhead does not have to be as large as one may first assume.

It should also be noted that the steps preceding $t_1$, i.e. what triggers a node to transmit, normally depend on what channel or medium access method that is used. For example, Slotted ALOHA, CSMA (Carrier Sense Multiple Access) or even a scheme with scheduled transmit occasions (like in STDMA) may be used. Even though STDMA in itself is complex, it should be understood that deploying the proposed invention in separate timeslots allows a novel (node scheduled) STDMA derivative that then makes the STDMA scheme more robust to fading and mobility, hence requiring slower schedule updates.

Although it has been said that the node transmitting the data packet has the responsibility in determining which node that should forward the data packet, it is also possible to assign another node (or optionally a list of nodes) that take on the duty of deciding and subsequently sending the forwarding order. This information must then be included together with the data packet. This has been described also for SDF and the advantage is that it enables cluster of nodes to act cooperatively together to improve communication fidelity, e.g. through diversity. A further advantage of this local handling of forwarding order decisions is that less energy is consumed and that resources may be spatially reused more efficiently as interference is reduced. This is particularly useful in protocols such as the proposed MUD-enabled SDF, as control traffic may increase relative plain SDF due to MUD-related control signaling. A further option is to assign predetermined stations exercising control functions by receiving and transmitting control messages.

Queuing disciplines are important since they are the key to fairly share the network resources and provide performance critical applications with performance guarantees. Generally, one makes a difference between queuing disciplines developed for best-effort applications (i.e. applications without QoS requirements) and disciplines developed for guaranteed-service applications (i.e. applications with QoS requirements). For best-effort connections the most important objective is to share the resources in a fair manner, and examples of queuing algorithms developed for this service type are: 1) Weighted Round Robin; 2) Deficit Round Robin; and 3) Weighted Fair Queuing, all of them trying to emulate the Generalised Processor Sharing algorithm. Naturally, for guaranteed-service applications the most important objective is to give performance guarantees, and examples of queuing disciplines fulfilling this task are: 1) Weighted Fair Queuing; 2) Virtual Clock; and 3) Earliest Due Date.

Figure 5:
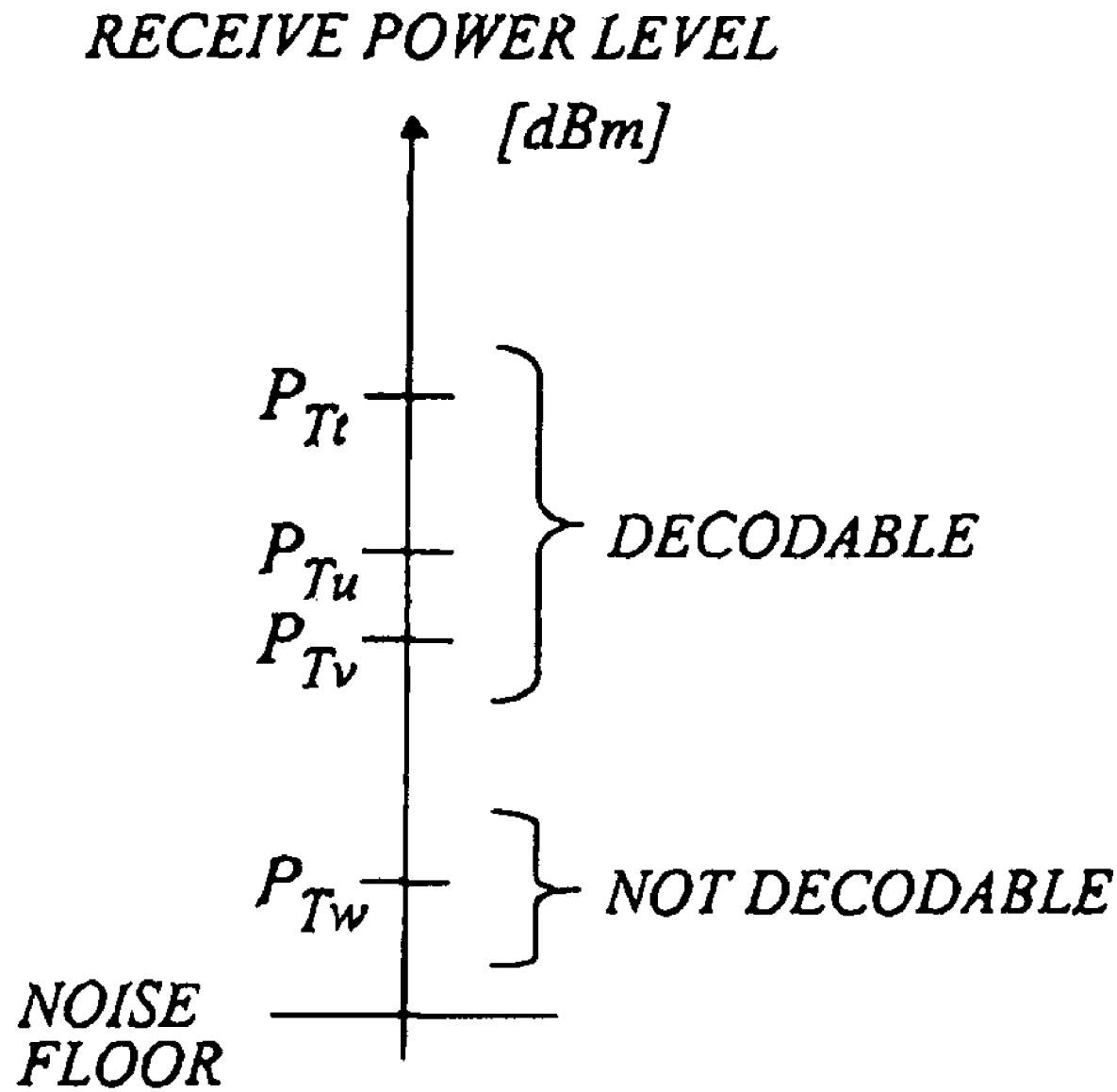
FIG. 5 is a schematic diagram illustrating an example of receive power levels at a relay candidate node.

FIG. 5 shows an example of how the receive power may be distributed from different users at a receiving node. In this example, the MUD detector is capable of decoding the three strongest signals from nodes $T_t$, $T_u$ and $T_v$ but not the rather weak signal from the fourth transmitting node $T_w$. As the path gain differs between the transmitting nodes and other candidate nodes, the receive power level will be different at these nodes and hence the order as well as the number of decodable data packets will differ.

Figure 6:
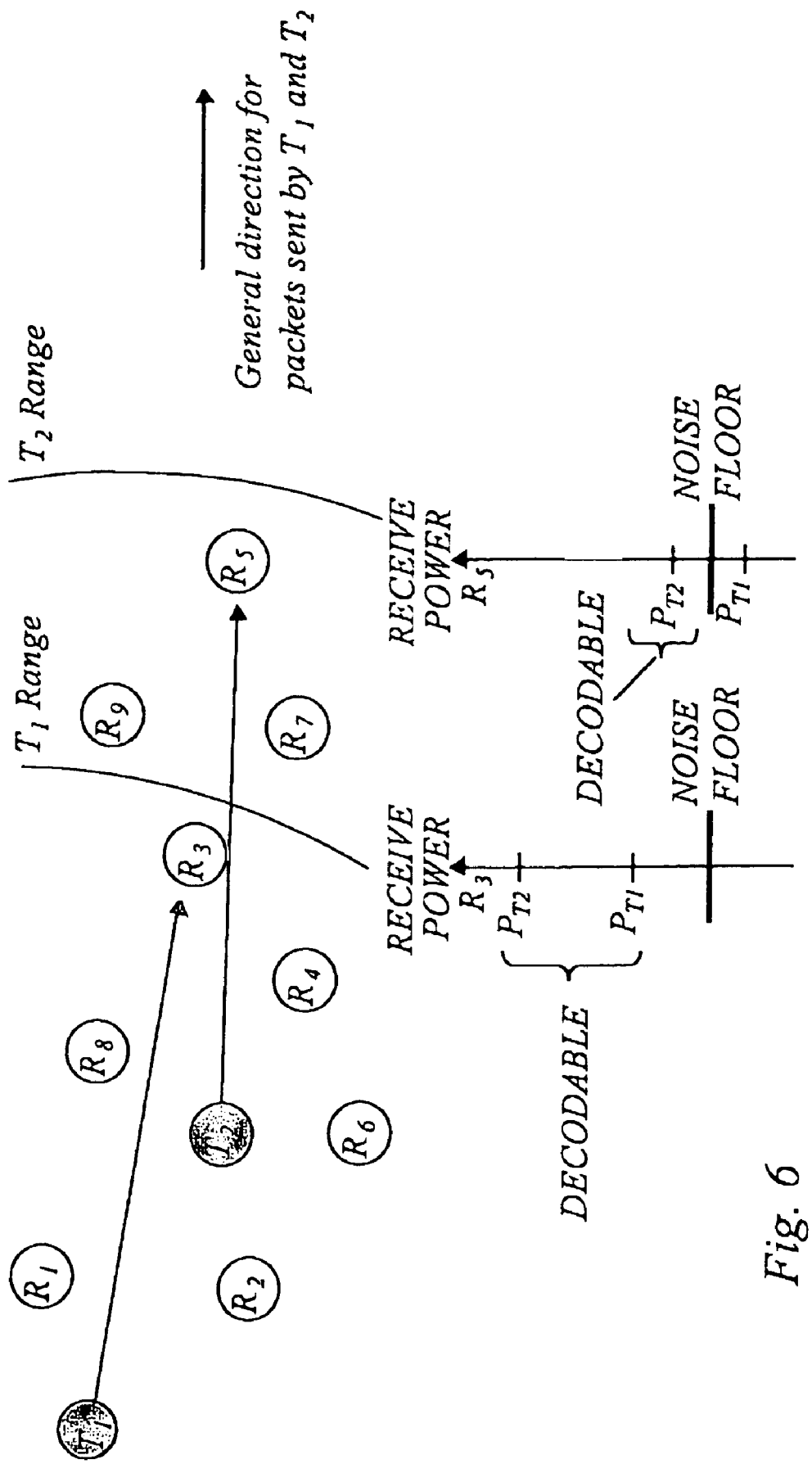
FIG. 6 is a schematic diagram of transmitting nodes and receiving nodes illustrating the effective forwarding result after prioritizations and corresponding forwarding orders according to an example.

It is noted that if a forward (cost) progress criterion is adopted for the prioritization, it is often so that the packet(s) with the lowest receive power level will be of the highest priority. Therefore, such a packet will typically "jump over" nodes and it will be attenuated on its way, until it is received and accepted by a more distant candidate node. This is shown in FIG. 6 where transmit power bars indicate the receive power levels of the data packets, and the arrows shows an example of an effective result from the prioritizations in candidate nodes and transmitting nodes.

In summary, the technology described concerns the prioritization(s) and exchange of messages allowing MUD to be efficiently incorporated into the framework of for example contention-based protocols, and especially diversity-oriented forwarding protocols such as SDF.

For diversity-oriented forwarding where the existence of multiple relay candidate nodes is exploited, multiple data packets may be decoded at the candidate nodes. A candidate node prioritizes among correctly decoded packets based on various selection/performance criteria. This may for example be related to flow control (avoid buffer overflow), congestion control (aims to optimize throughput), or performance shaping (prioritization e.g. based on QoS measures).

A candidate node may respond with acknowledgements for the prioritized data packets, either sent in an aggregate acknowledgement message or separately. When receiving aggregate acknowledgement messages, the transmitting nodes extract their corresponding acknowledgements.

If diversity is not involved, it may be sufficient, e.g. for ALOHA in conjunction with shortest-path routing, for a transmitting node to merely transmit data and receive a (multicasted) acknowledgement.

The transmitting node prioritizes among the multiple received acknowledgements based on a desired performance objective and subsequently selects a candidate node to which a corresponding forwarding order is transmitted.

A selected candidate node inserts decoded and accepted packets for which forwarding orders have been received in its transmit buffer such that it optimizes desired performance objectives.

Another important aspect of the invention concerns the exemplary prioritization criterion based on largest forward or cost progress that may be employed internally in the candidate node, internally in the transmitting node, or in both candidate and transmitting nodes.

The special combination of MUD and diversity-oriented forwarding, enabled by the novel prioritization and message exchange scheme, brings with it several benefits over the prior art.

Compared to MUD used in conjunction with STDMA in a multi-hop network, the invention provides the following benefits. First, the invention exhibits significantly lower complexity than conventional MUD and STDMA as scheduling is avoided altogether, while offering the benefits given by MUD. Second, there is no schedule with strict MUD constraints that need to be updated very often due to mobility, or extremely fast if the channel fades quickly. Moreover, there is no schedule with MUD constraints that need to be changed every time traffic pattern changes. In short, compared to STDMA combined with MUD, the invention offers the benefits of MUD with significantly lower complexity. Furthermore, the invention may advantageously be used when the channel is fading, whereas scheduled multiple access protocols such as STDMA will encounter degraded performance.

With the design of a MUD-compatible diversity forwarding message exchange scheme, the benefits of diversity forwarding are not just retained (for instance enabling exploitation of a fading channel), but it also enables significantly enhanced throughput. There are two main reasons for this:

Thanks to MUD, multiple data packets can be decoded concurrently at each node, provided that the received power levels are high enough, given used link mode (e.g. coding rates) of the received packets.

Forward progress will generally be higher, as a preferred prioritization criterion is to select packets having the highest (information) forward (cost) progress. Often, this will mean that the selected packets are those packets that are received and correctly decoded, while at the same time having a low receive power level. In plain SDF for example, this would however be impossible. In particular, one notes that fading gains can be utilized also for the low power level packets. High forward progress means that a packet spends less time in the network, hence leading to reduced delay, and then by disappearing out of the network fast, offers the radio resources for other traffic.

Moreover, the exchange scheme allows increased flexibility in candidate nodes and packet transmitting nodes to improve the overall performance, compared to single-user-detection based SDF. In the candidate nodes, prioritization among multiple packets may be used to maximize forward progress (as indicated above), shaping QoS and for other optimization criteria, both at reception of data and subsequently when forwarding orders are received. The added flexibility in the transmitting node, as more ACKs may be received, may be used to optimize forward progress, congestion control, QoS shaping and for other optimization criteria.

Figure 7:
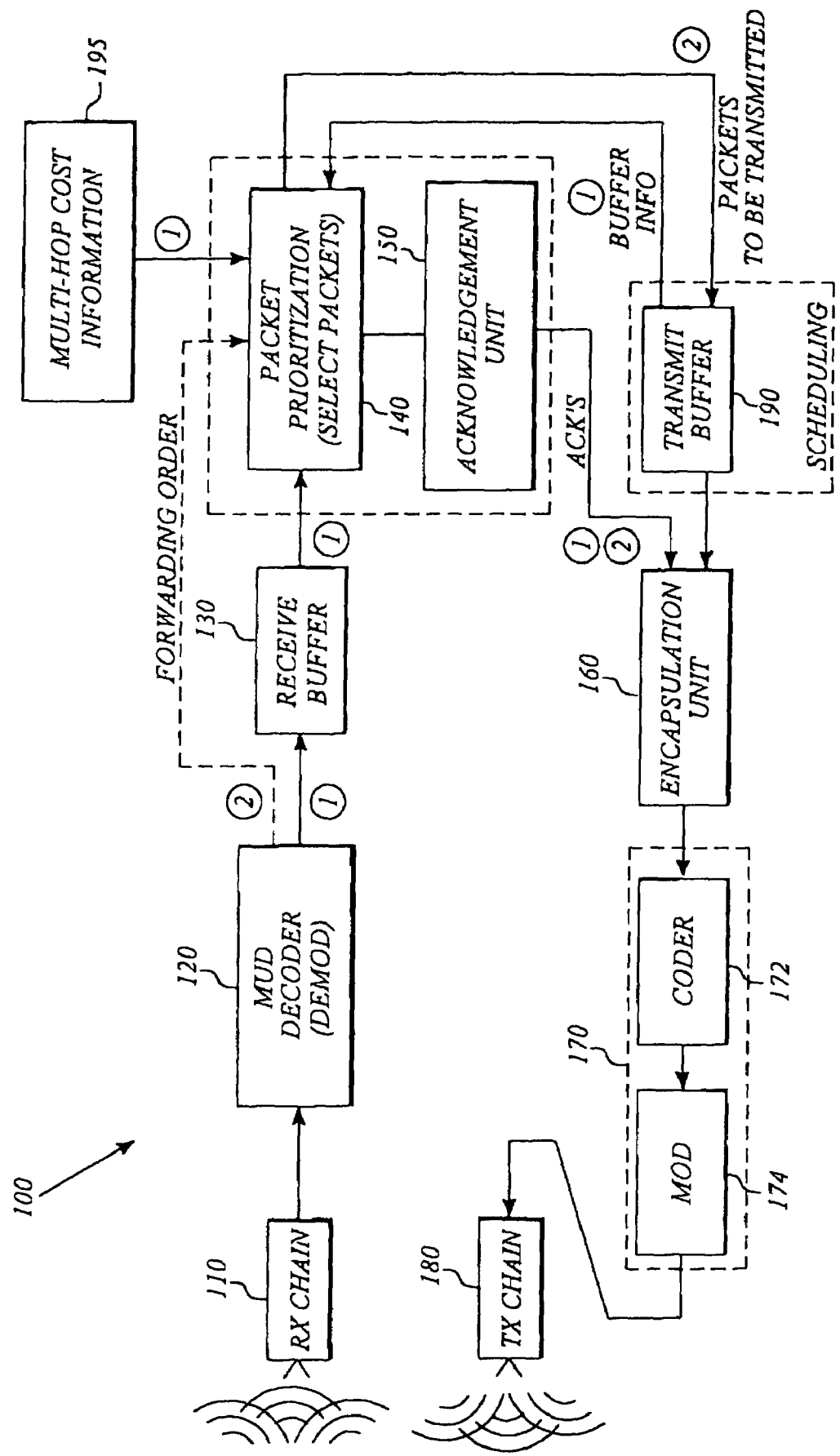
FIG. 7 is a schematic block diagram of relevant parts on the receiver side according to an example embodiment.

FIG. 7 is a schematic block diagram of relevant parts on the receiver side according to an example embodiment. In particular, the implementation of FIG. 7 is suitable for a relay candidate node customized for operation in a MUD-compatible diversity forwarding protocol. The relay candidate node 100 of FIG. 7 basically comprises a conventional receiver chain 110 connected to an antenna or antenna system, a MUD decoder 120, a receive buffer 130, a packet prioritization unit 140, an acknowledgement unit 150, a conventional encapsulation unit 160, a coder and modulation unit 170, a conventional transmission chain 180 connected to an antenna or antenna system, a transmit buffer 190 as well as a unit 195 for providing multi-hop cost information.

The relay candidate node 100 receives a superposition of signals transmitted from multiple transmitting nodes through the receiver chain 110 including operations such as A/D-conversion and possibly also frequency conversion. The MUD decoder 120 operates on the received superposition of signals to concurrently decode multiple data packets, which in the first round (1) are transferred to the receive buffer 130. The MUD decoder 120 typically performs demodulation simultaneously with the multi-user decoding.

The packet prioritization unit 140 performs suitable prioritization based on an objective performance function and selects one or more packets that are suitable for forwarding. In the prioritization process, the prioritization unit 140 normally makes use of multi-hop cost information obtained from an underlying cost determination protocol such as Bellman-Ford or similar protocol. In the relay candidate node 100, such cost information is preferably gathered and/or generated in the multi-hop cost information unit 195, which is connected to the packet prioritization unit. The number of packets that can be accepted for forwarding may be limited due to available buffer space, and buffer space information is therefore normally transferred from the transmit buffer 190 to the prioritization unit 140 for the purpose of determining the packet limit. The packet prioritization unit 140 co-operates with or is integrated with an acknowledgement unit 150, which in the first round (1) issues a packet acknowledgement for each selected packet for transmission to the corresponding packet transmitting node.

The packet acknowledgements are transmitted in an aggregate acknowledgement message or separately by using the encapsulation unit 160 for encapsulation and addressing, the combined unit 170 for coding 172 and modulation 174 as well as the transmission chain 180 including operations such as frequency conversion and D/A-conversion.

In the second round (2), the relay candidate node 100 preferably receives one or more forwarding orders from transmitting nodes that have selected the candidate node. The received forwarding order(s) is/are typically forwarded to the packet prioritization unit 140. The acknowledgement unit 150, which co-operates with the packet prioritization unit 140, may issue forwarding order acknowledgments for transmission to the corresponding transmitting node or nodes.

The packet prioritization unit 140 preferably inserts selected packets having corresponding forwarding orders into the transmit buffer 190. Typically, the packets are inserted according to a predetermined optimization criterion. Optionally, however, the transmit buffer 190 may be re-scheduled, e.g. based on delay or priority classes. If QoS support is not desired, a simple First-In First-Out (FIFO) queue can be used.

The packets in the transmit buffer 190 are subsequently transmitted to relay candidate nodes further on in the multi-hop network by using the encapsulation unit 160 for encapsulation and addressing, the combined unit 170 for coding 172 and modulation 174 as well as the transmission chain 180.

Figure 8:
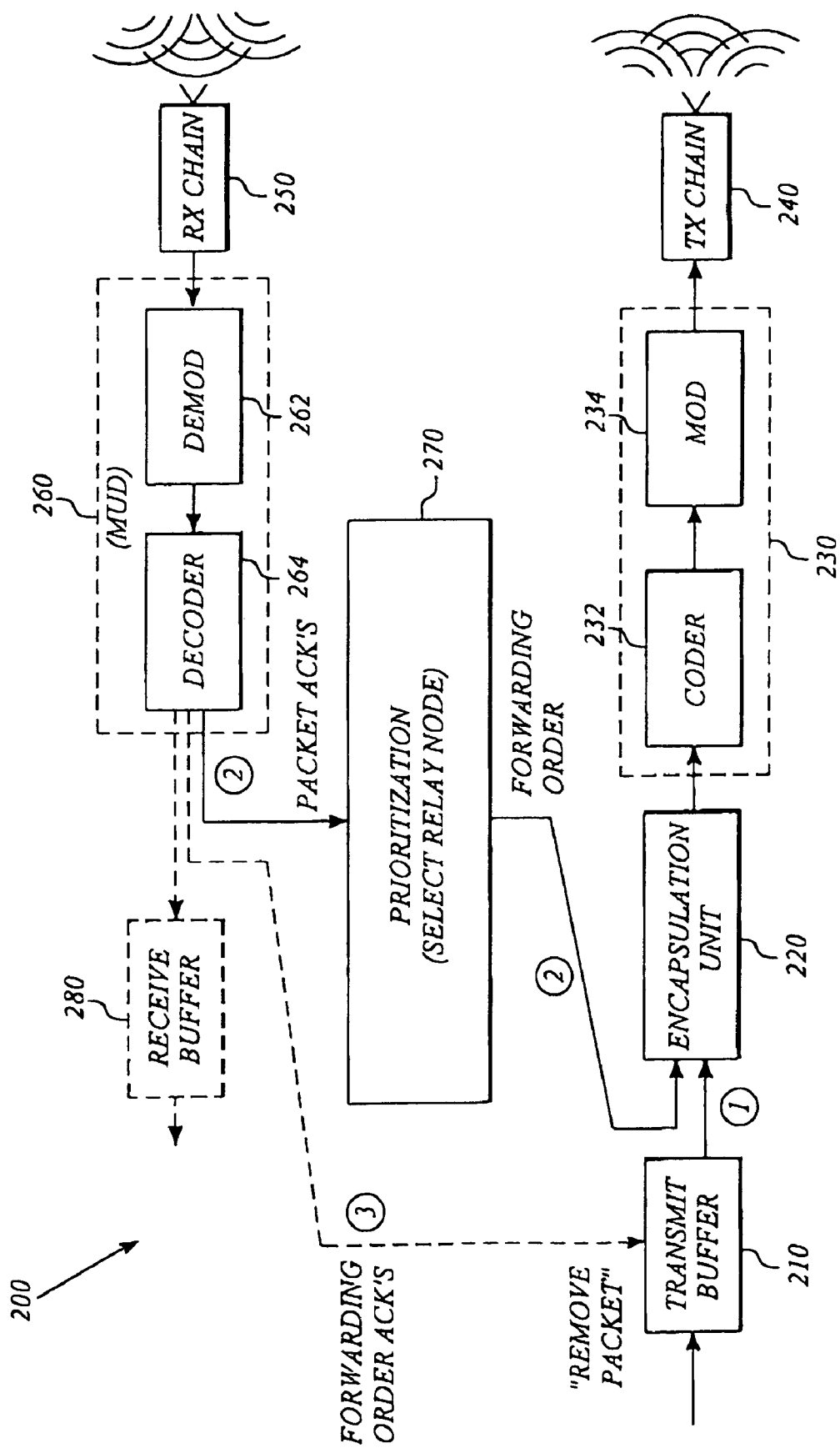
FIG. 8 is a schematic block diagram of relevant parts on the transmitter side according to an example embodiment.

FIG. 8 is a schematic block diagram of relevant parts on the transmitter side according to an example embodiment. In particular, the implementation of FIG. 8 is suitable for a transmitting node customized for operation in a MUD-compatible diversity forwarding protocol. The transmitting node 200 of FIG. 8 basically comprises a transmit buffer 210, an encapsulation unit 220, a coder and modulation unit 230, a conventional transmission chain 240 connected to an antenna or antenna system, a conventional receiver chain 250, a demodulation and decoder unit 260, a node prioritization unit 270 and a receive buffer 280.

The transmitting node 200 has data packets ready for transmission towards one or more destination nodes in its transmit buffer 210. In round (1), packets are transferred from the transmit buffer 210 to the encapsulation unit 220 for encapsulation and addressing. From an addressing perspective, the transmitting node 200 employs multicasting or possibly broadcasting to transmit the packets to a number of relay candidate nodes in the multi-hop network. For more information on this particular aspect, reference is made to [8]. The encapsulated packet information is transferred to the combined unit 230 for coding 232 and modulation 234 as well as the transmission chain 240 for transmission towards the relay candidate nodes.

In the second round (2), the transmitting node 200 receives packet acknowledgement(s) from one or more relay candidate nodes via the receiver chain 250 and the combined unit 260 for demodulation 262 and decoding 264. The packet acknowledgements are transferred to the node prioritization unit 270, which selects a suitable relay candidate node based on an objective performance function. The prioritization unit 270 then issues a forwarding order for transmission to the selected relay node.

In the third round (3), forwarding order acknowledgements received from one or more selected relay nodes may optionally be employed for removing corresponding packets from the transmit buffer 210.

Detailed information on MUD detectors/decoders can be found in the literature, e.g. in reference [15], which describes a state-of-the art family of linear multi-user detectors.

It should be understood that the packet prioritization on the receiver side may be distributed to an associated control node responsible for one or more receiving nodes. In the same manner, the prioritization to select a suitable relay node on the transmitter side may also be distributed to an associated control node.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] R. Rom, M. Sidi, "Multiple Access Protocols, Performance and Analysis", Springer-Verlag, New York, 1990, ISBN-0-387-97253-6, pp. 1-5.

[2] "Enhanced Interior Gateway Routing Protocol" as printed Apr. 7, 2003 from www.cisco.com/warp/public/103/eigrp-toc.pdf.

[3] R. Nelson and L. Kleinrock, "The spatial Capacity of a slotted ALOHA multi-hop packet radio network with capture", in Trans. On Com., Jun 84.

[4] J. Jubin and J. D. Tornow, "The DARPA packet radio network protocols" in IEEE Proceedings, Jan. 87. pp. 21-32.

[5] M. B. Pursely and H. B. Russel, "Network protocols for frequency-hop packet radios with decoder side information", in IEEE J. Selected Areas of Com., 12(4) 1994, pp. 155-174.

[6] U.S. Pat. No. 6,097,703.

[7] International Patent Application Publication WO 98/56140.

[8] U.S. patent application Publication US 2002/0051425 A1.

[9] "UTRA (Universal Terrestrial Radio Access) High Speed Downlink Packet Access (HSDPA) ", 3GPP, TS [25.308], v. 0.1.0, September, 2001.

[10] TIA/EIA IS-856, "CDMA 2000: High rate packet data air interface specification", Std., November 2000.

[11] P. Viswanath, D. Tse and R. Laroia, "Opportunistic Beamforming using Dumb Antennas", IEEE Transactions on Information Theory, vol. 48(6), June, 2002.

[12] B. Shrader, T. Giles, "Scheduling and performance of multi-hop radio networks with multi-user detection", Proceedings of the $2^{nd}$ Swedish Workshop on Wireless Ad-Hoc Networks, Stockholm, Johannesbergs Slott, Mar. 5-6, 2002.

[13] A.-M. Chou, and V. O. K. Li, "Slot allocation strategies for TDMA protocols in multi-hop packet radio networks", INFOCOM, May 1992, Vol.2, pp. 710-716.

[14] V. Rodoplu and T. Meng, "Position based CDMA with multi-user detection (P-CDMA/MUD) for wireless ad hoc networks", IEEE Symposium on Spread-Spectrum Technology & Applications, Sept. 6-8, 2000.

[15] U.S. Pat. No. 6,618,433.

The invention claimed is:

1. A method for contention-based forwarding of information in a multi-hop network having multiple nodes, said method comprising the steps of:

at least one of a plurality of transmitting nodes transmitting its data packet signal to multiple relay candidate nodes;

receiving, in at least one receiving relay candidate node, a superposition of signals transmitted from multiple transmitting nodes;

employing multi-user detection (MUD) to decode multiple data packets from the received superposition of signals;

prioritizing among correctly decoded packets to select at least one data packet suitable for forwarding;

replying with a packet acknowledgement for each selected packet;

prioritizing among relay candidate nodes from which acknowledgements are received to select at least one suitable relay node;

transmitting a forwarding order to said at least one selected relay node instructing the selected relay node or nodes to take on responsibility for forwarding the information to a next node in the multi-hop network.

2. The method according to claim 1, wherein said packet prioritizing step comprises the step of selecting multiple data packets suitable for forwarding, and multiple packet acknowledgements are transmitted to a plurality of corresponding transmitting nodes.

3. The method according to claim 2, wherein said multiple packet acknowledgements are aggregated in a single acknowledgement message.

4. The method according to claim 1, further comprising the step of executing, in response to a forwarding order, forwarding of a corresponding selected packet.

5. The method according to claim 4, further comprising the step of said at least one receiving node replying, in response to a forwarding order, with a corresponding forwarding order acknowledgement.

6. The method according to claim 1, further comprising the step of said at least one receiving node limiting the number of selected packets.

7. The method according to claim 1, wherein said packet prioritizing step is performed based on optimization of a predetermined objective function.

8. The method according to claim 7, wherein said predetermined objective function includes information cost progress.

9. The method according to claim 1, wherein said packet prioritizing step is performed based on at least one Quality of Service (QoS) requirement.

10. The method according to claim 1, wherein said forwarding is performed based on a contention-based multiple access protocol.

11. The method according to claim 10, wherein said contention-based multiple access protocol is diversity oriented.

12. The method according to claim 11, wherein said diversity-oriented protocol is the selection diversity forwarding (SDF) protocol.

13. The method according to claim 10, wherein said contention-based multiple access protocol is an opportunistic protocol.

14. The method according to claim 1, wherein said step of prioritizing among relay candidate nodes is performed based on optimization of a predetermined objective function.

15. The method according to claim 1, wherein at least one of said multiple relay candidate nodes is implicitly addressed based on an indication that it is a neighbor of an explicitly addressed relay candidate node.

16. The method according to claim 1, further comprising the step of each transmitting node removing, in response to an acknowledgement of a previously transmitted packet, the acknowledged packet data from a data buffer in the transmitting node.

17. The method according to claim 1, wherein said multi-hop network is a broadcastlmulticast packet radio network.

18. A system for contention-based forwarding of information in a multi-hop network having multiple nodes, wherein at least one of a plurality of transmitting nodes being configured transmitting its data packet signal to multiple relay candidate nodes, said system comprising:
means for receiving, in at least one receiving relay candidate node, a superposition of signals transmitted from multiple transmitting nodes;
means for employing multi-user detection (MUD) to decode multiple data packets from the received superposition of signals;
means for prioritizing among correctly decoded packets to select at least one data packet suitable for forwarding;
means for replying with a packet acknowledgement for each selected packet;
means for prioritizing among relay candidate nodes from which acknowledgements are received to select at least one suitable relay node; and
means for transmitting a forwarding order to said at least one selected relay node instructing the selected relay node or nodes to take on responsibility for forwarding the information to a next node in the multi-hop network.

19. The system according to claim 18, wherein said packet prioritizing means is operable for selecting multiple data packets suitable for forwarding, and said replying means is operable for transmitting multiple packet acknowledgements to a plurality of corresponding transmitting nodes.

20. The system according to claim 19, wherein said replying means is operable for aggregating multiple packet acknowledgements in a single acknowledgement message.

21. The system according to claim 18, further comprising means for executing, in response to a forwarding order, forwarding of a corresponding selected packet.

22. The system according to claim 18, further comprising means for replying, in response to a forwarding order, with a corresponding forwarding order acknowledgement.

23. The system according to claim 18, further comprising means for limiting the number of selected packets.

24. The system according to claim 18, wherein said packet prioritizing means is configured to perform packet prioritization based on optimization of a predetermined objective function.

25. The system according to claim 24, wherein said predetermined objective function includes information cost progress.

26. The system according to claim 18, wherein said packet prioritizing means is configured to perform packet prioritization based on at least one Quality of Service (QoS) requirement.

27. The system according to claim 18, wherein said means for prioritizing among relay candidate nodes is configured to perform candidate node prioritization based on optimization of a predetermined objective function.

28. The system according to claim 18, wherein said at least one transmitting node further comprises means for implicitly addressing at least one of said multiple relay candidate nodes based on an indication that it is a neighbor of an explicitly addressed relay candidate node.

29. The system according to claim 18, wherein said multi-hop network is a broadcastlmulticast packet radio network.

30. A communication node in a packet radio multi-hop network, said communication node comprising electronic circuitry configured to:
receive a superposition of signals transmitted from multiple transmitting nodes;
employ multi-user detection (MUD) to decode multiple data packets from the received superposition of signals;
prioritize among correctly decoded packets to select at least one data packet suitable for forwarding;
reply with a packet acknowledgement for each selected packet; and
receive, from at least one transmitting node having transmitted its data packet signal to multiple receiving relay candidate nodes and having selected a suitable relay node based on acknowledgements from multiple relay candidate nodes, a forwarding order instructing the selected relay node to take on responsibility for forwarding the information to a next node in the multi-hop network.

31. The communication node according to claim 30, wherein said electronic circuitry is configured to select multiple data packets suitable for forwarding and transmit multiple packet acknowledgements to a plurality of corresponding transmitting nodes.

32. The communication node according to claim 31, wherein electronic circuitry is configured to aggregate multiple packet acknowledgements in a single acknowledgement message.

33. The communication node according to claim 30, wherein the electronic circuitry is configured to limit the number of selected packets.

34. The communication node according to claim 30, wherein the electronic circuitry is configured to perform packet prioritization based on optimization of a predetermined objective function.

35. The communication node according to claim 34, wherein said predetermined objective function includes information cost progress.

36. The communication node according to claim 30, wherein the electronic circuitry is configured to perform packet prioritization based on at least one Quality of Service (QoS) requirement.

* * * * *

UNITED STATES PATENT AND TRADEMARK OFFICE
CERTIFICATE OF CORRECTION

PATENT NO. : 7,464,166 B2 Page 1 of 1
APPLICATION NO. : 10/729835
DATED : December 9, 2008
INVENTOR(S) : Larsson et al.

It is certified that error appears in the above-identified patent and that said Letters Patent is hereby corrected as shown below:

On the Face Page, in Field (75), under "Inventors", in Column 1, Line 2, delete "Järfälla" and insert -- Sollenluna --, therefor.

In Column 3, Line 17, delete "arc" and insert -- are --, therefor.

In Column 7, Line 39, delete "$P_{RX1}$" and insert – $P_{RX1}$ --, therefor.

In Column 9, Line 55, delete "optional" and insert -- optimal --, therefor.

In Column 16, Line 6, delete "Corn.," and insert -- Com., --, therefor.

In Column 17, Line 47, in Claim 17, delete "broadcastlmulticast" and insert -- broadcast/multicast --, therefor.

In Column 18, Line 42, in Claim 29, delete "broadcastlmulticast" and insert -- broadcast/multicast --, therefor.

Signed and Sealed this

Second Day of June, 2009

JOHN DOLL
*Acting Director of the United States Patent and Trademark Office*